(12) United States Patent
Watanabe et al.

(10) Patent No.: US 10,473,247 B2
(45) Date of Patent: Nov. 12, 2019

(54) METHOD OF FORMING A PIPE JOINT, PIPE JOINT COMPONENT, AND PIPE JOINT, FLUID CONTROL DEVICE, FLUID CONTROL UNIT AND SEMICONDUCTOR FABRICATION APPARATUS INCLUDING THE PIPE JOINT COMPONENT

(71) Applicant: FUJIKIN INCORPORATED, Osaka (JP)

(72) Inventors: Kazunari Watanabe, Osaka (JP); Toshiyuki Inada, Osaka (JP); Izuru Shikata, Osaka (JP); Tsutomu Shinohara, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 231 days.

(21) Appl. No.: 15/568,938

(22) PCT Filed: May 27, 2016

(86) PCT No.: PCT/JP2016/065799
§ 371 (c)(1),
(2) Date: Oct. 24, 2017

(87) PCT Pub. No.: WO2016/194843
PCT Pub. Date: Dec. 8, 2016

(65) Prior Publication Data
US 2018/0119860 A1 May 3, 2018

(30) Foreign Application Priority Data
May 29, 2015 (JP) .................................. 2015-109854

(51) Int. Cl.
*F16L 37/00* (2006.01)
*F16L 37/15* (2006.01)
(Continued)

(52) U.S. Cl.
CPC ............. *F16L 37/15* (2013.01); *F16L 23/036* (2013.01); *F16L 37/144* (2013.01)

(58) Field of Classification Search
CPC ......... F16L 37/14; F16L 37/15; F16L 37/144; F16L 19/025
See application file for complete search history.

(56) References Cited

U.S. PATENT DOCUMENTS 3,746,376 A * 7/1973 Gold ........................ F16L 19/04
285/334.2
4,613,112 A * 9/1986 Phlipot .................... F16L 37/22
137/71
(Continued)

FOREIGN PATENT DOCUMENTS

| JP | 32887/1986 | 2/1986 |
| JP | 62-98888 | 6/1987 |

(Continued)

OTHER PUBLICATIONS

Official Communication issued in Patent Application No. PCT/JP2016/065799, dated Jun. 28, 2016.

*Primary Examiner* — Reinaldo Sanchez-Medina
(74) *Attorney, Agent, or Firm* — Greenblum & Bernstein, P.L.C.

(57) ABSTRACT

A method of forming a pipe joint includes: preparing a first pipe member, a second pipe member, a casing, and a pressing member to be arranged in the casing to press a second flange portion of the second pipe member against a first flange portion of the first pipe member, the casing having a first opening, a second opening, a third opening, a flange receiving space, and a receiving space in communication with the flange receiving space and adapted to receive the pressing member; inserting the first pipe member from the second opening toward the first opening until the first flange portion comes to rest within the flange receiving (Continued)

space; inserting the second pipe member into the second opening with the second flange portion ahead until the second flange portion comes into contact with the first flange portion.

19 Claims, 15 Drawing Sheets

(51) Int. Cl.
  *F16L 23/036* (2006.01)
  *F16L 37/14* (2006.01)

(56) References Cited

U.S. PATENT DOCUMENTS

| | | | | |
|---|---|---|---|---|
| 6,416,087 B1 * | 7/2002 | Kremer | ............... | F16L 19/02 285/328 |
| 6,431,612 B1 * | 8/2002 | Walker | ............... | F16L 37/144 285/305 |
| 8,113,547 B2 * | 2/2012 | Andre | ............... | F16L 37/144 285/310 |
| 2003/0137148 A1 * | 7/2003 | Andre | ............... | F16L 37/084 285/305 |
| 2003/0178844 A1 * | 9/2003 | Klinger | ............... | F16L 37/144 285/319 |
| 2005/0179259 A1 | 8/2005 | Sugiyama et al. | | |
| 2014/0049042 A1 | 2/2014 | Jones | | |

FOREIGN PATENT DOCUMENTS

| | | |
|---|---|---|
| JP | 6-159575 | 6/1994 |
| JP | 2004-53006 | 2/2004 |
| JP | 2013-29185 | 2/2013 |
| JP | 2013-96507 | 5/2013 |

* cited by examiner

METHOD OF FORMING A PIPE JOINT, PIPE JOINT COMPONENT, AND PIPE JOINT, FLUID CONTROL DEVICE, FLUID CONTROL UNIT AND SEMICONDUCTOR FABRICATION APPARATUS INCLUDING THE PIPE JOINT COMPONENT

TECHNICAL FIELD

The present invention relates to a method of forming a pipe joint, a pipe joint component, and a pipe joint, a fluid control device, a fluid control unit and a semiconductor fabrication apparatus including the pipe joint component.

BACKGROUND ART

In semiconductor fabrication apparatuses, a fluid such as ultrapure water or a process gas is used frequently. To the body of a semiconductor fabrication apparatus, a large number of devices/instruments handling a fluid (which may hereinafter be referred to as "fluid devices"), such as flow control valves, flowmeters and flow controllers, are connected by forming a joint structure called "pipe joint". In periodic checks and trouble with components constituting the body of the apparatus, fluid devices connected to the body of the apparatus are disconnected and checked, and then re-connected to the body of the apparatus by forming the above-mentioned joint structure. Apart from this, during fabrication processes, for a variety of checks/inspections and for cleaning, the fluid devices are frequently connected to and disconnected from other machines/apparatuses using a joint component.

It is therefore requested that fluid devices be able to be connected to and disconnected from the body of an apparatus by the easiest possible work, and when connected, be sealed reliably to prevent fluid leakage. A fluid joint disclosed in Patent Document 1 is a pipe joint to meet such requests.

The fluid joint disclosed in Patent Document 1 certainly meets the above-mentioned requests. Fluid joints of this type are used in large numbers in recent semiconductor fabrication apparatuses/lines configured to mass-produce the same type of semiconductor devices from large-diameter wafers. Recently, a semiconductor fabrication plant called "minimal fab" has been proposed and is expected to be put to practical use in near future.

The minimal fab is being developed for small-volume production in great varieties wherein a half-inch wafer is a unit of substrate production. The minimal fab comprising minimal-scale semiconductor fabrication apparatuses/lines is expected to reduce the amount of capital investment to one thousandth of the conventional. Early practical application of the minimal fab is being eagerly anticipated.

PRIOR ART DOCUMENT

Patent Document

Patent Document 1: Japanese Unexamined Patent Application Publication No. 2013-96507

SUMMARY OF THE INVENTION

Problems to be Solved by the Invention

It is however difficult to apply the joint of Patent Document 1 directly to the semiconductor fabrication apparatuses/lines for the minimal fab.

For the minimal fab, standardization of outer dimensions and outer designs of fabrication apparatuses is being aimed at, where the individual fabrication apparatuses, which should be compact, are intended to measure 294 mm in width, 450 mm in depth and 1440 mm in height. User interfaces including operation screens are also intended to be standardized to achieve uniformity among all the apparatuses. In such semiconductor fabrication apparatuses for the minimal fab, device installation spaces are extremely narrow. Accordingly, the devices to be installed are required to be as compact as possible, and there is a constraint that an ample space is not available for joining work. Thus, with respect to a joint structure, reduced size and enhanced ease of work in a narrow work space are desired along with a reliable seal.

The present invention has been made in view of the above problems. A primary object thereof is to provide a pipe joint component which provides a reliable seal and which is reduced in size and dramatically enhances ease of work in a narrow work space as compared with conventional ones.

Another object of the present invention is to provide a pipe joint component which is easy to assemble, high in sealing capacity, and suitable to be applied to fabrication apparatuses for a minimal fab.

Another object of the present invention is to provide a fluid control device, a fluid control unit and a semiconductor fabrication apparatus including the pipe joint component.

Another object of the present invention is to provide a method of connecting a fluid device to the body of an apparatus using the pipe joint component.

Means for Solving the Problems

The method of forming a pipe joint according to the present invention intended to achieve the above objects is a method of forming a pipe joint including a first hollow pipe member with a first flange portion, a second hollow pipe member with a second flange portion, and a casing for connecting the first and second pipe members with a seal created between the first and second flange portions, wherein the method comprises preparing a plate-like pressing member for pressing the second flange portion against the first flange portion, preparing the casing to have a first end wall, a second end wall opposite the first end wall, a first side wall between the first and second end walls, a flange receiving space (1) inside, and a receiving space (2) inside adapted to receive the pressing member, the first end wall having a first opening, the second end wall having a second opening, the first side wall having a third opening, the flange receiving space (1) being in communication with the first and second openings, the receiving space (2) being in communication with the flange receiving space, and allow the first pipe member to be inserted from the second opening toward the first opening until the first flange portion comes to rest within the flange receiving space, inserting the second pipe member into the second opening with the second flange portion ahead until the second flange portion comes into contact with the first flange portion, and inserting the pressing member through the third opening into the receiving space (2) to press the second flange portion against the first flange portion, thereby creating a seal between the first and second flange portions.

The pipe joint component according to the present invention intended to achieve the above objects comprises a first pipe member with a first flange portion at a first end, a second pipe member with a second flange portion at a first end, and a casing and a pressing member for connecting the first and second pipe members with a seal created between the first and second flange portions, wherein the casing has a first end wall, a second end wall opposite the first end wall, a first side wall between the first and second end walls, a flange receiving space (1) inside, and a receiving space (2) inside adapted to receive the pressing member, the first end wall having a first opening, the second end wall having a second opening, the first side wall having a third opening, the flange receiving space (1) being in communication with the first and second openings, the receiving space (2) being in communication with the flange receiving space, the pressing member is a plate-like elastic member, the first pipe member is adapted to be inserted from the second opening toward the first opening until the first flange portion comes to rest within the flange receiving space, the second pipe member is adapted to be inserted into the second opening with the second flange portion ahead until the second flange portion comes into contact with the first flange portion, wherein when the pressing member is inserted through the third opening into the space (2), the second flange portion is pressed against the first flange portion to create a seal between the first and second flange portions.

Advantageous Effects of the Invention

The present invention can provide a pipe joint component which provides a reliable seal and which is reduced in size and dramatically improves ease of work in a narrow work space as compared with conventional ones.

The present invention can also provide a pipe joint component which is easy to assemble, high in sealing capacity, and suitable to be applied to fabrication apparatuses for a minimal fab.

The present invention can further provide a fluid control device, a fluid control unit and a semiconductor fabrication apparatus including the pipe join component.

The present invention can further provide a method of connecting a fluid device to the body of an apparatus using the pipe joint component.

MODE OF CARRYING OUT THE INVENTION

With reference to the accompanying drawings, a pipe joint according an embodiment of the present invention will be described.

Figure 1:
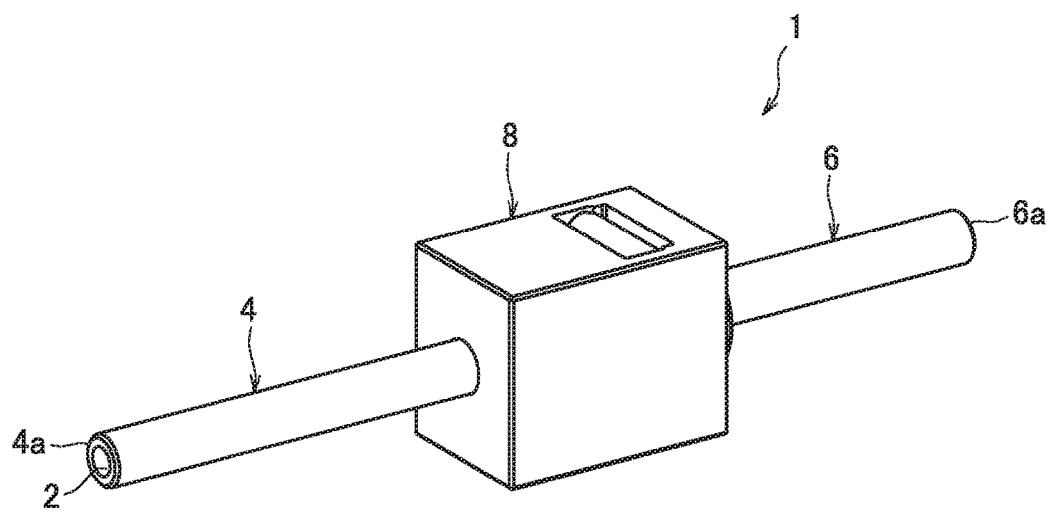
FIG. 1 is a perspective view of a pipe joint according to an embodiment of the present invention.

As shown in FIG. 1, a pipe joint 1 comprises a first pipe member 4 and a second pipe member 6, each having a fluid passage 2, and a casing 8 for receiving and connecting the first and second pipe members 4, 6. The first and second pipe members 4, 6 as well as the casing 8 is made from metal. The first and second pipe members 4, 6 each have an outer end (second end) 4a, 4b to be located outside the casing of the pipe joint 1.

Figure 2:
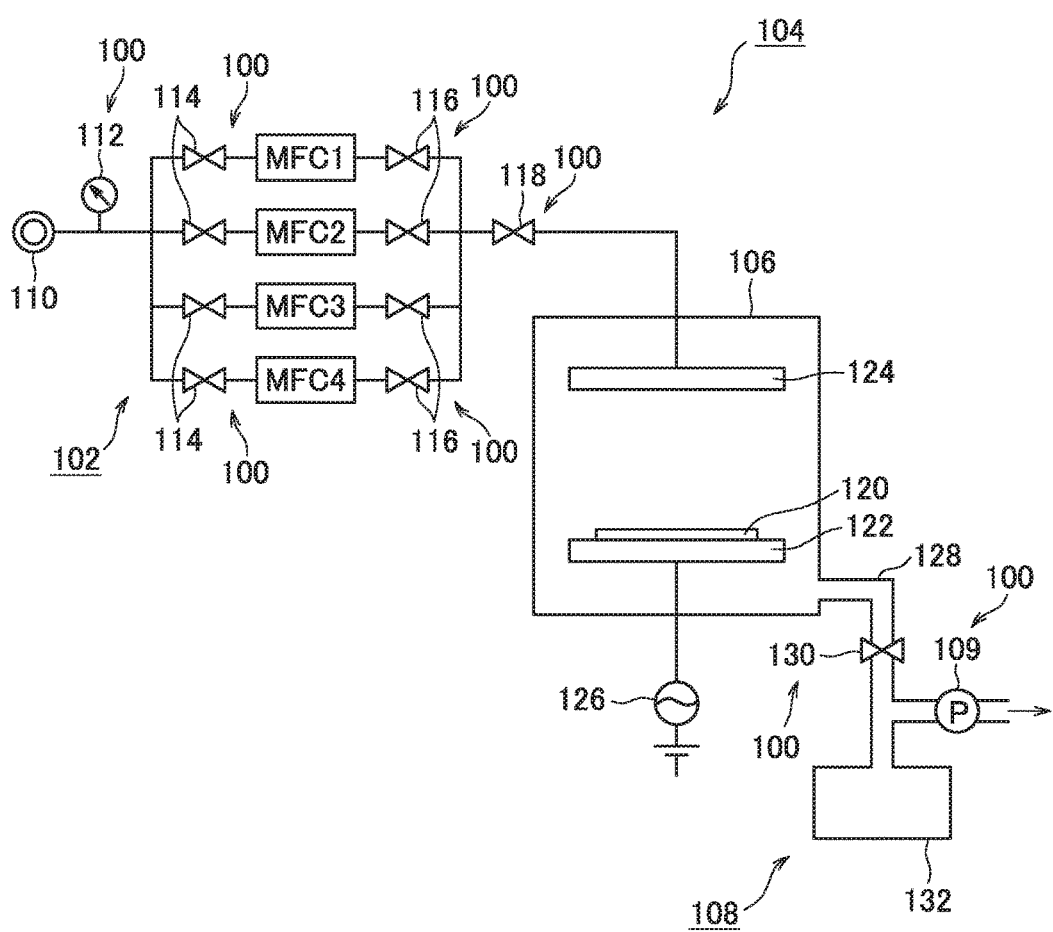
FIG. 2 is a diagram schematically showing a fluid control device, a fluid control unit and a semiconductor fabrication apparatus to which the pipe joint of FIG. 1 is applied.

FIG. 2 is a diagram schematically showing a semiconductor fabrication apparatus 104 comprising a fluid control unit 102 including fluid control devices 100 to which the pipe joint 1 is applied. The semiconductor fabrication apparatus 104 is a CVD apparatus, for example, which comprises a fluid control unit 102 constituting a gas supply means, a vacuum chamber 106, an exhaust means 108 and so on to form a passive film (oxide film) on a wafer 120 described later.

In the description of the present embodiment, the term "flow control device 100" may be used to indicate any of devices which constitute the semiconductor fabrication apparatus 104 and relate to control of a fluid, including a pressure gauge 112, on/off valves 114, 116, 118, 130 and MFCs (mass flow controllers) 1 to 4, or alternatively used as a generic term for those devices.

The flow control unit 102 is a device which regulates the flow rate, etc. of a gas to be supplied from a gas supply source 110 to the vacuum chamber 106, and comprises a pressure gage 112, on/off valves 114, 116 and MFCs 1 to 4. Between the flow control unit 102 and the vacuum chamber 106, an on/off valve 118 is provided. The vacuum chamber 106 comprises a table 122 on which a wafer 120 is placed and an electrode 124 to form a thin film on the water 120. The vacuum chamber 106 is electrically connected to a commercial power supply 126. The exhaust means 108 comprises exhaust piping 128, an on/off valve 130, a dust collector 132 and a vacuum pump 109.

In forming a thin film on the wafer 120, supply of a gas to the vacuum chamber 106 is controlled by operations of the on/off valves 114, 116, the MFCs 1 to 4 and the on/off valve 118. When removing powder particles which are by-products produced in forming a thin film on the wafer 120, the on/off valve 130 is opened to allow the powder particles to flow in the exhaust piping 128 to the dust collector 132, where they are removed.

To each flow control device 100, a first pipe member 4 or a second pipe member 6 is attached at an inlet as well as at an outlet. A pipe joint 1 is formed, for example by connecting a first pipe member 4 attached to a flow control device 100 and a second pipe member 6 attached to another flow control device 100.

If piping is present between flow control devices 100, a first pipe member 4 or a second pipe member 6 is attached to each end of the piping.

Ways of attaching a first pipe member 4 or a second pipe member 6 to a fluid control device 100 include welding the outer end 4a of the first pipe member 4 or the outer end 6a of the second pipe member 6 to the inlet or the outlet of the fluid control device 100, screwing the former into the latter, and joining them using another joint structure.

Ways of attaching a first pipe member 4 or a second pipe member 6 to each end of piping include welding the outer end 4a of the first pipe member 4 or the outer end 6a of the second pipe member 6 to each end of the piping, and joining them using another joint structure.

When replacing a fluid control device 100 in the flow control unit 102 or in the semiconductor fabrication apparatus 104 or installing a new fluid control device 100, a pipe joint 1 is formed by connecting a first pipe member 4 or a second pipe member 6 attached to a to-be-installed fluid control device 100 to a second control member 6 or a first control member 4 already present in the flow control unit 102 or in the semiconductor fabrication apparatus 104.

The pipe joint 1 and the on/off valves 114, 116, 118, 130 are reduced in size. Thus, the fluid control unit 102 in which the fluid control devices 100 and piping are connected by forming the pipe joint 1 can be small in size.

The fluid control unit 102 small in size is suited to be used in a semiconductor fabrication apparatus 104 which requires reduction in size, and thus, serves to realize a so-called minimal-fab apparatus, or small-sized semiconductor fabrication apparatus for fabricating small-diameter wafers experimentally for test and research. Such minimal-fab apparatus requires only a smaller installation area within a clean room, thus reduces the cost of running the clean room and allows trial wafers for fabricating a variety of semiconductor devices to be obtained at low cost.

Figure 3:
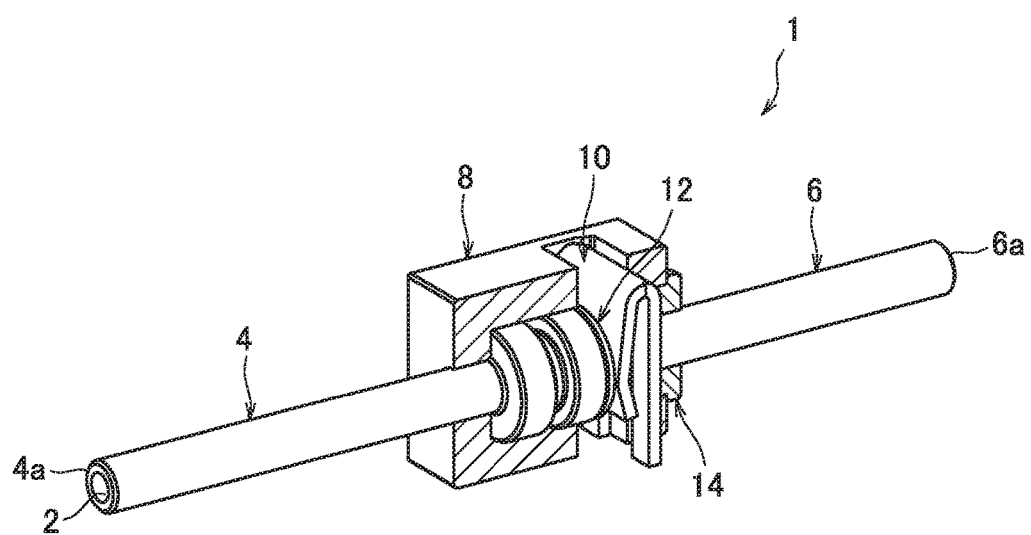
FIG. 3 shows the pipe joint of FIG. 1 partly in section.
Figure 4:
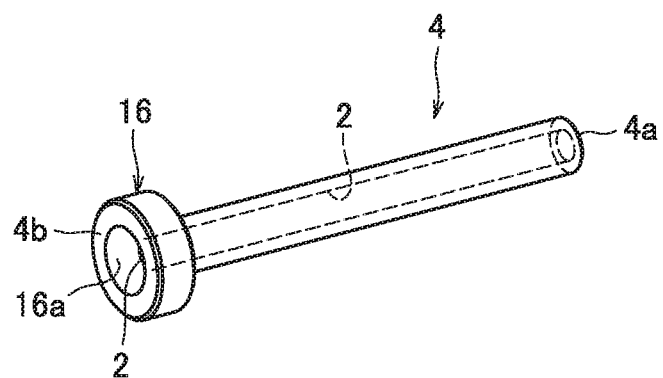
FIG. 4 is a perspective view of a first pipe member shown in FIG. 3.

As shown in FIG. 3, the pipe joint 1 further comprises a plate-like elastic pressing member 10 and a washer 12, both arranged within the casing 8, and a bush 14 fitted to the casing 8. The pressing member 10, the washer 12 and the bush 14 are made from metal As shown in FIG. 4, the first pipe member 4 has a first flange portion 16 at an inner end (first end) 4b to be located within the casing of the pipe joint 1. The first flange portion 16 has a tapered recess 16a defining an open end of the fluid passage 2.

Figure 5:
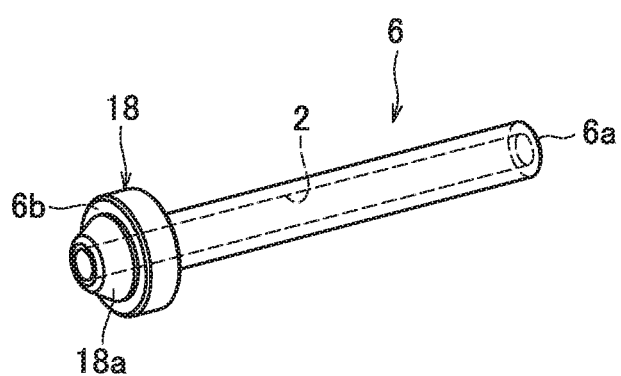
FIG. 5 is a perspective view of a second pipe member shown in FIG. 3.

As shown in FIG. 5, the second pipe member 6 has a second flange portion 18 at an inner end (first end) 6b to be located within the casing of the pipe joint 1, which is equal or virtually equal or nearly equal in diameter to the first flange portion 16.

The second flange portion 18 has a tapered projection 18a defining an open end of the fluid passage 2.

Figure 6:
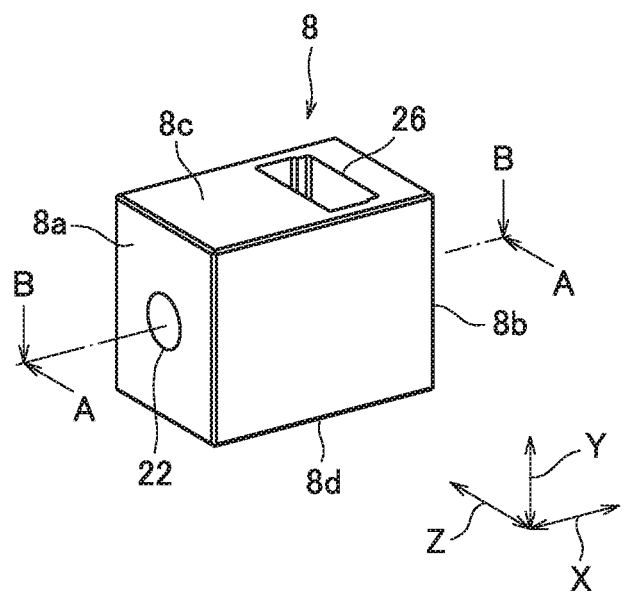
FIG. 6 is a perspective view of a casing shown in FIG. 3.

As shown in FIG. 6, the casing is a cuboidal component of small outer size (for example, in FIG. 6, dimension in pipe diameter direction Y: ca. 12 mm, dimension in pipe length direction X: ca. 15 mm, dimension in width direction Z: ca. 10 mm) comprising a first end wall 8a, a second end wall 8b opposite the first end wall 8a, a first side wall 8c, and a second side wall 8d opposite the first side wall 8c. The casing 8 has a cylindrical cavity inside.

The first end wall 8a has a first opening 22 which allows the outer end 4a of the first pipe member 4 to project. The first opening 22 is a round shape smaller in diameter than the first and second flange portions 16, 18. The second end wall 8b of the casing 8 has a second opening 24 which allows the outer end 6a of the second pipe member 6 to project.

The second opening 24 is a round shape slightly greater in diameter than the first and second flange portions 16, 18 to allow the first and second flange portions 16, 18 to pass through it.

The first side wall 8c of the casing 8 has a third opening 26 which allows the pressing member 10 to be inserted. With the first flange portion 16 resting on the first end wall 8a and with the tapered projection 18a of the second flange portion 18 placed against the tapered recess 16a of the first flange portion 1, the pressing member 10 is inserted into the casing 8 to press on the second flange portion 18.

Figure 7:
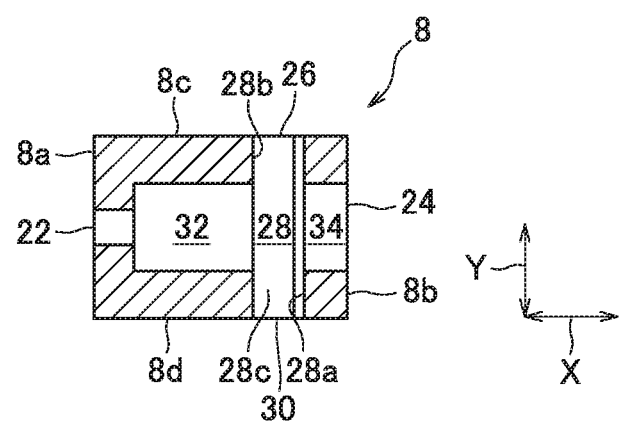
FIG. 7 shows a cross section of the casing viewed from an A-A side indicated in FIG. 6.

As shown in FIG. 7, the casing 8 has a receiving space (2) 28 to receive the pressing member 28, defined by a first inner end face 28a, a second inner end face 28b, and a pair of inner side faces 28c, 28d. The first inner end face 28a extends from the third opening 26 into the casing 8 in the pipe diameter direction Y (perpendicularly to the pipe length direction) and has the above-mentioned second opening 24. The second inner end face 28b extends from the third opening 26 into the casing 8 in the pipe diameter direction Y and faces the first inner end face 28a. The inner side faces 28c, 28d each connect the first and second inner end faces 28a, 28b. As shown in FIG. 7, the second side wall 8d of the casing 8 has a fourth opening 30 which is opposite the third opening 26 and in communication with the receiving space (2) 28.

Figure 8:
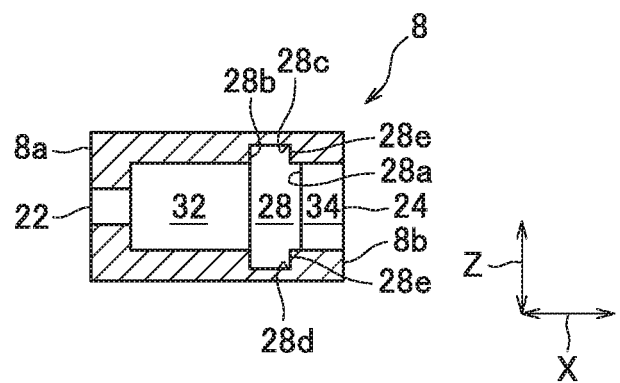
FIG. 8 shows a cross section of the casing viewed from a B-B side indicated in FIG. 6.

When viewed in the pipe length direction X in FIG. 8, the inner side faces 28c, 28d each have an inward projecting portion 28e adjoining the first inner end face 28a. Because of the inward projecting portions 28e, the width, or dimension in the width direction Z of the first inner end face 28a is smaller than that of the second inner end face 28b. The casing 8 has a flange-receiving space (1) 32 to receive the first and second flange portions 16, 18, to the first opening 22 side of the receiving space (2) 28 to receive the pressing member 10. The flange-receiving space (1) 32 has an inside diameter slightly greater than the diameter of the first and second flange portions 16, 18. The casing also has a receiving space 34 to receive a bush 14, to the second opening 24 side of the receiving space (2) 28. The receiving space 34 has an inside diameter approximately equal to that of the flange-receiving space (1) 32.

Figure 9:
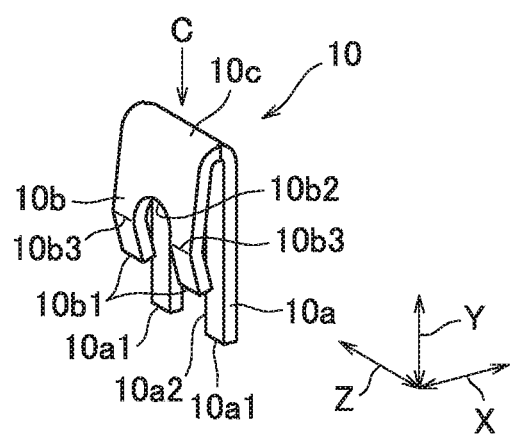
FIG. 9 is a perspective view of a pressing member shown in FIG. 3.

As shown in FIG. 9, the pressing member 10 comprises a positioning portion 10a, a pressing portion 10b and a curved portion 10c. The pressing member 10 is fitted in the receiving space (2) 28 to press the second flange portion 18 against the first flange portion 16, thereby creating a seal 36 between the first and second pipe members 4, 6, as described later.

Specifically, the positioning portion 10a is brought into contact with the first inner end face 28a, thereby positioning the pressing member 10 within the receiving space (2) 28. The pressing portion 10b located to the second inner end face 28b side presses on the second flange portion 18. The curved portion 10a connects the positioning portion 10a and the pressing portion 10b. By the curved portion 10 experiencing deformation, the pressing member 10, specifically the pressing portion 10b exerts a pressing force.

The positioning portion 10a and the pressing position 10b have U-shaped cutouts 10a2, 10b2 which extend from their distal ends 10a1, 10b1 facing each other, in the pipe diameter direction Y over a length greater than the diameter of the second pipe member 6, respectively.

The pressing portion 10b is bent between the distal end 10b1 and the curved portion 10c to protrude to the side opposite the positioning portion 10a, forming a ridge line 10b3 extending widthwise across the pressing portion 10b.

In the present embodiment, the pressing member 10 is formed such that the positioning portion 10a extends longer in the pipe diameter direction Y than the pressing portion 10b.

Figure 10:
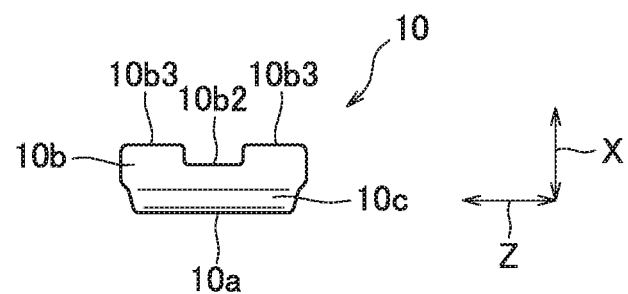
FIG. 10 shows the pressing member viewed from a C side indicated in FIG. 9.

As shown in FIG. 10, the pressing member 10 is formed such that the positioning portion 10a has a dimension in the width direction Z which renders the positioning portion 10a complementary to the inward projecting portions 28e when the pressing member 10 is fitted in the receiving space (2) 28. Thus, the positioning portion 10a brought into contact with the first inner end face 28a is smaller in dimension in the width direction Z than the pressing portion 10b located to the second inner end face 28b side.

Figure 11:
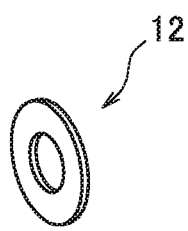
FIG. 11 is a perspective view of a washer shown in FIG. 3.

As shown in FIG. 11, the washer 12 is an annular plate-like shape and mounted on the second pipe member 6 between the pressing member 10 and the second flange portion 18. The washer 12 has an outside diameter (ca. 7 mm, for example) slightly smaller than the inside diameter of the receiving spaces 32, 34. The washer 12 has experienced a hardening treatment such as quenching, and can prevent the pressing member 10 from scratching the second pipe member 6 in the process of fitting the pressing member 10.

Figure 12:
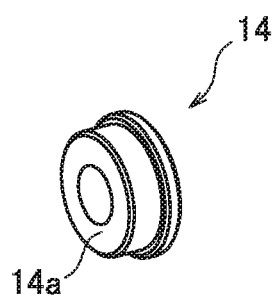
FIG. 12 is a perspective view of a bush shown in FIG. 3.

As shown in FIG. 12, the bush 14 is a stepped cylindrical shape and mounted on the second pipe member 6 with an end 14a fitted in the second opening 24. The bush 14 has an outside diameter (ca. 7 mm, for example) slightly smaller than the inside diameter of the receiving spaces 32, 24.

Next, with reference to FIGS. 13 to 18, how the pipe joint 1 is assembled will be described in detail.

Figure 13:
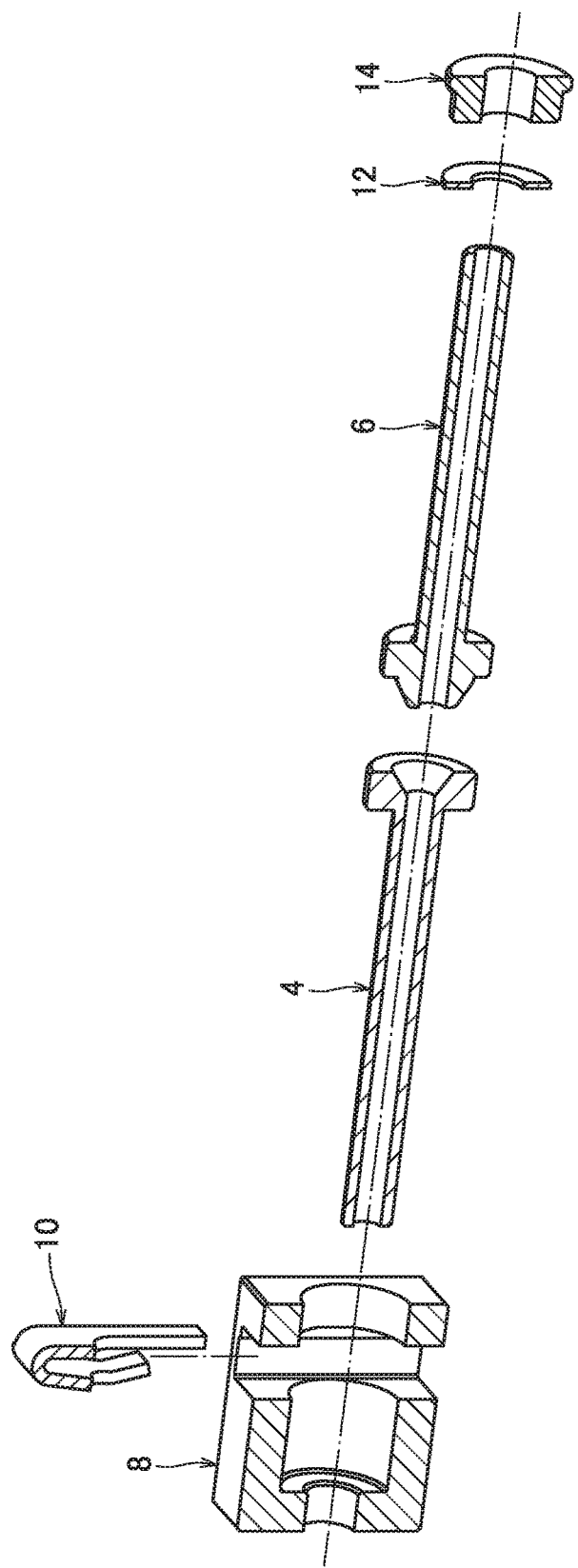
FIG. 13 is an exploded perspective sectional view showing the pipe joint of FIG. 1 broken down into component parts.

First, as shown in FIG. 13, component parts of the pipe joint 1 are arranged in order. If, for example the first pipe member 4 and the casing 8 are already present in the fluid control unit 102, only the second pipe member 6, the washer 12, the bush 14 and the pressing member 10 are required to be prepared. If the second pipe member 6, the washer 12 and the bush 14 are already present in the fluid control unit 102, only the first pipe member 4, the casing 8 and the pressing member 10 are required to be prepared.

Figure 14:
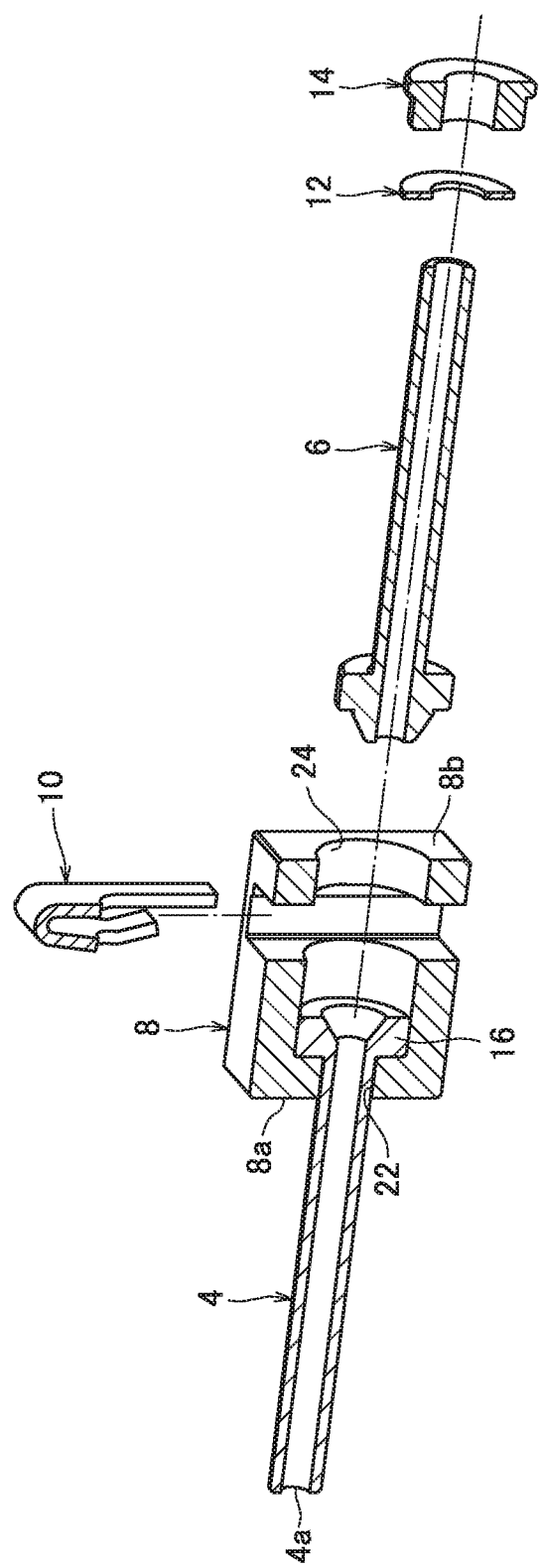
FIG. 14 shows a phase following the phase shown in FIG. 13, wherein the first pipe member is inserted in the casing.

Next, as shown in FIG. 14, the first pipe member 4 is inserted into the casing 8. Specifically, the first pipe member 4 is inserted with the outer end 4a ahead from the second opening 24 into the first opening 22 until the first flange portion 16 comes to rest on the first end wall 8a within the flange-receiving space (1) 32 of the casing 8.

Figure 15:
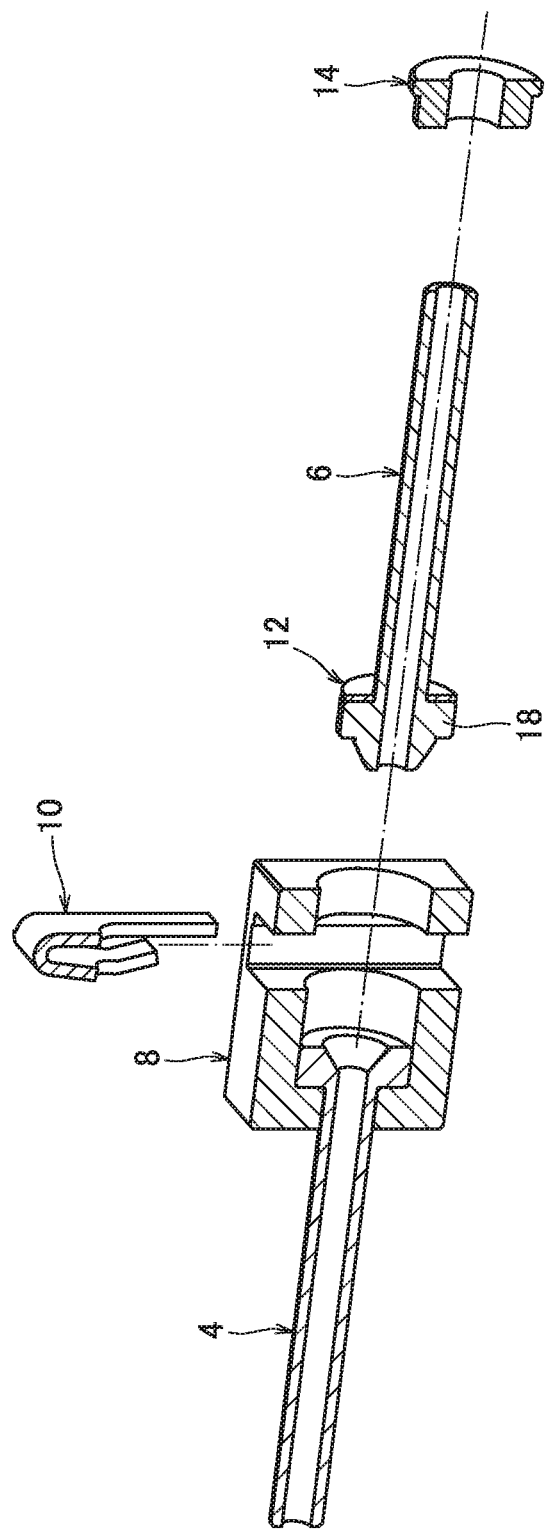
FIG. 15 shows a phase following the phase of FIG. 14, wherein the washer is mounted on the second pipe member.
Figure 16:
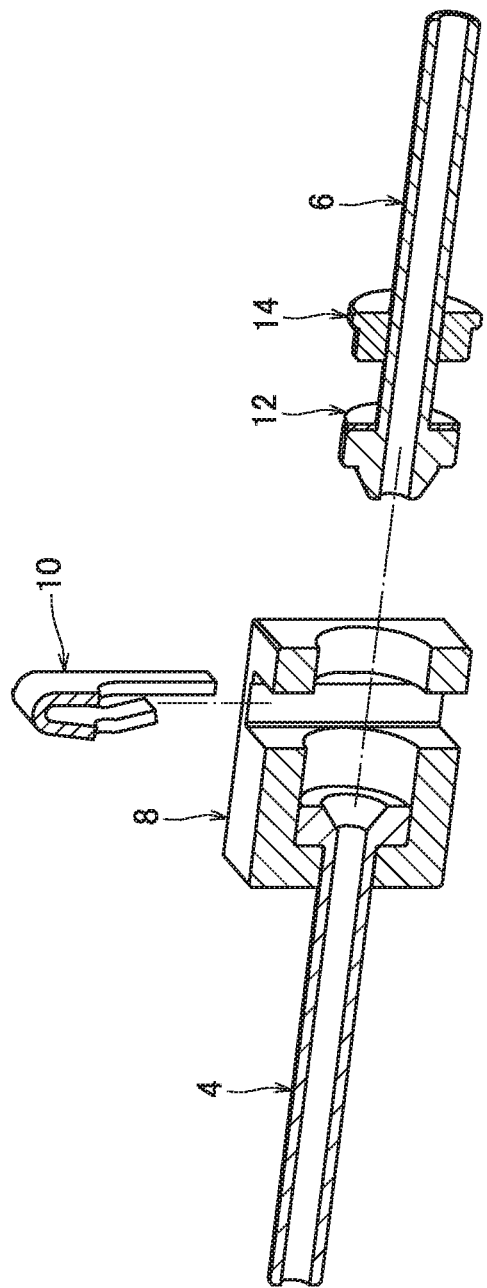
FIG. 16 shows a phase following the phase of FIG. 17, wherein the bush is mounted on the second pipe member.

Next, as shown in FIG. 15, the washer 12 is mounted on the second pipe member 6 and brought into contact with the second flange portion 18. Next, as shown in FIG. 16, the bush 14 is mounted on the second pipe member 6.

Figure 17:
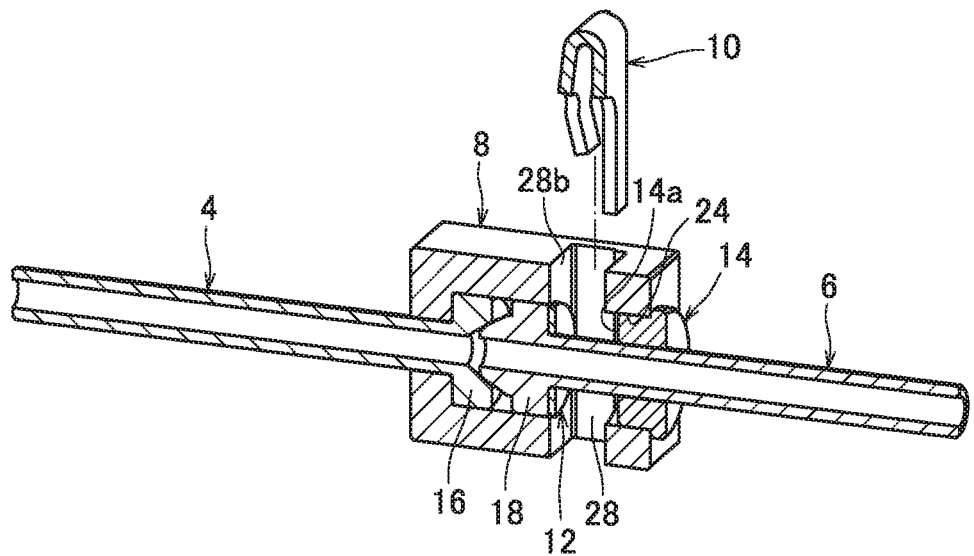
FIG. 17 shows a phase following the phase of FIG. 16, wherein the second pipe member is inserted in the casing.

Next, as shown in FIG. 17, the second pipe member 6 is inserted into the second opening 24 with the second flange portion 18 ahead until the second flange portion 18 comes into contact with the first flange portion 16 within the flange-receiving space (1) 32 of the casing 8, where the washer 12 is located to the second inner end face 28b side within the receiving space (2) 28 and the bush 14 is fitted in the second opening 24 with the end 14a inside.

Figure 18:
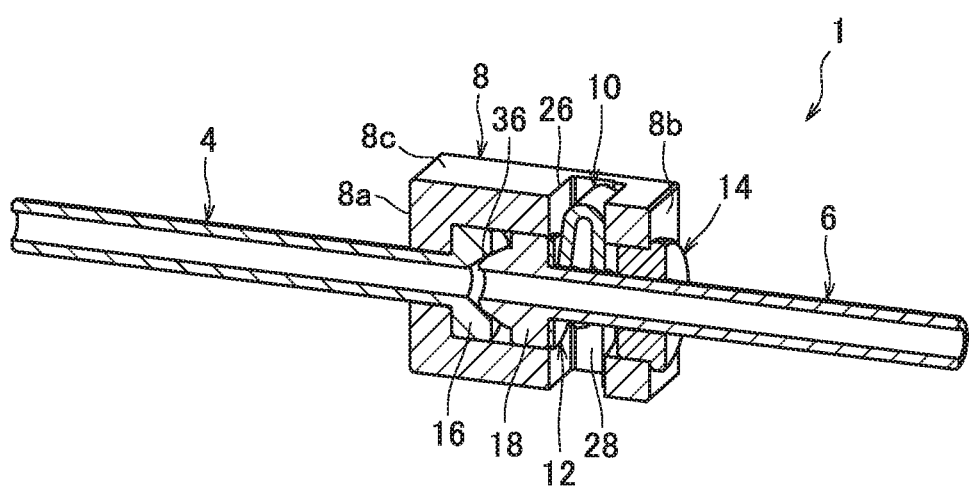
FIG. 18 shows a phase following the phase of FIG. 17, wherein the assembly of the pipe joint is completed with the pressing member fitted in the casing.

Last, as shown in FIG. 18, the pressing member 10 is fitted in the casing 8 by pushing the pressing member 10 into the receiving space (2) 28 from the third opening 26, using pliers or a dedicated jig to hold the pressing portion 10a closer to the positioning portion 10a. By the pressing member 10 pressing the second flange portion 18 against the first flange portion 16, a seal 36 is created between them. The third opening 26 has a size allowing the pressing member 10 to be inserted into the casing 8 with the first flange portion 16 resting on the first end wall 8a and with the second flange portion 18 placed against the first flange portion 16. The assembly of the pipe joint 1 is thus completed.

In order to allow the pressing member 10 to be pushed into the receiving space (2) 28 more easily and more reliably, the ends 10a1 and/or the opposite ends 10b1 of the pressing member 10 may be rounded or angled for increased ease of inserting them into the third opening 26.

Figure 19:
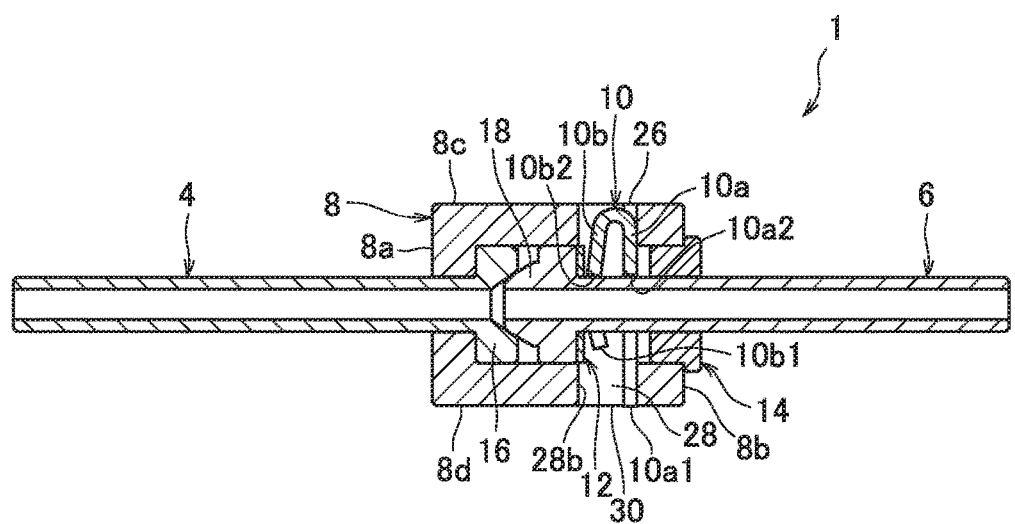
FIG. 19 is a longitudinal sectional view of the pipe joint of FIG. 18.

As shown in FIG. 19, in the pipe joint 1 assembled according to the above-described procedure, the pressing member is fitted with the bottoms of the U-shaped cutouts 10a2, 10b2 in the positioning portion 10a and the pressing portion 10b located near or on the second pipe member 6 and with the distal ends 10a1 of the positioning portion 10a projecting from the fourth opening 30.

In the present embodiment, the pressing member 10 is inserted into the receiving space (2) 28 from the third opening 26. The pressing member 10 may however be inserted from the fourth opening 30, in which case, the distal ends 10a1 of the positioning portion 10a project from the third opening 26.

Since the washer 12 is located to the second inner end face 28b side within the receiving space (2) 28, the pressing portion 10b of the pressing member 10 presses on the washer 12, not on the first inner end face 28a, thereby pressing on the second flange portion 18 reliably.

Figure 20:
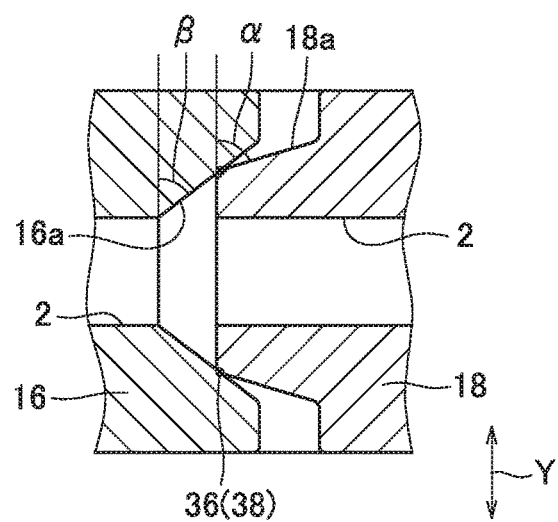
FIG. 20 is an enlarged view of portions creating a seal shown in FIG. 19.

As shown in FIG. 20, the inclination a of the surface of the tapered projection 18a of the second pipe portion 18 with reference to the pipe diameter direction Y, or in other words, the acute angle α between the surface of the tapered projection 18a and the pipe diameter direction Y is greater than the inclination β of the surface of the tapered recess 16a of the first flange portion 16 with reference to the pipe diameter direction Y, or in other words, the acute angle β between the surface of the tapered recess 16a and the pipe diameter direction Y.

If the inclination α is set between ca. 60° and 80°, for example, the inclination β is set to be smaller than inclination α between ca. 50° and 70°. By the edge of the tapered projection 18a coming into line contact with the tapered recess 16a, a seal 36 is created between the first and second pipe members 4, 6 along an annular sealing line 38.

Here, the term "line contact" includes not only a geometric line contact with a negligible width but also a line contact with a considerable width produced by elastic or plastic deformation.

Figure 21:
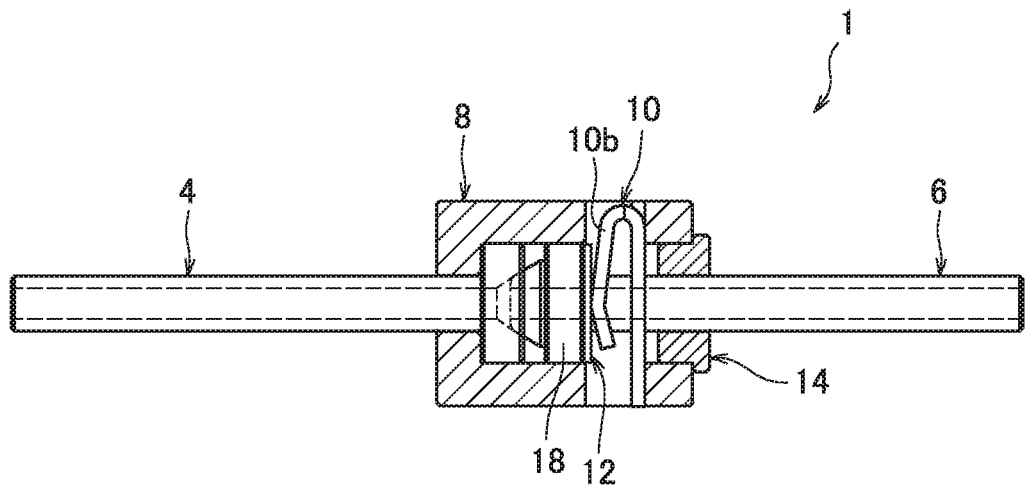
FIG. 21 shows the pipe joint of FIG. 18 partly in section.
Figure 22:
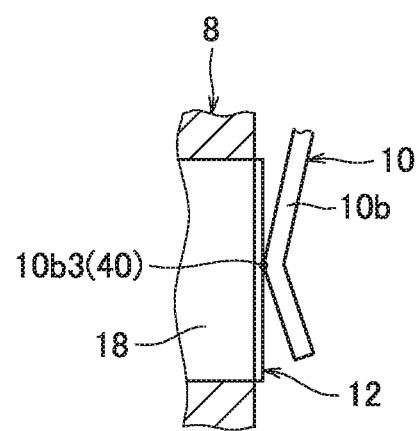
FIG. 22 is an enlarged view of a pressing portion shown in FIG. 21.

As shown in FIGS. 21 and 22, since the pressing portion 10b of the pressing member 10 has two ridge lines 10b3 formed by bending, the washer 12 is pressed by the pressing member 10 at two linear pressing lines 40.

As understood from the above description, the present embodiment can provide a pipe joint 1 which is easy to assemble, high in sealing capacity, and suitable to be applied to minimal-fab apparatuses and which contributes to increasing reliability and productivity, a fluid control device including the pipe joint 1, a fluid control unit including the fluid control device, and a semiconductor fabrication apparatus including the fluid control unit.

Specifically, the casing 8 has a third opening 26 in the first side wall 8c which allows the pressing member 10 to be inserted into the casing 8 with the first flange portion 16 resting on the first end wall 8a and with the second flange portion 18 placed against the first flange portion 16. This allows the pipe joint 1 to be sealed between the first and second pipe members 4, 6 only by easy work, i.e., fitting the pressing member 10 in the casing 8 by inserting it from the third opening 26 in the first side wall 8c into the casing 8 with the first and second flange portions 16, 18, the washer 12 and the bush 14 arranged therein, without using a turning device such as a spanner in the case of a small-sized apparatus, such as a minimal-fab apparatus, having only a narrow installation work space. The pipe joint 1 can thus dramatically increase ease of installation work including joining pipes.

Further, the pipe joint 1 requires no sealing member, which allows a reduction in number of component parts, eliminates work for fitting a miniature-sized sealing member to the pipe joint and removes a concern about loss of a sealing member during work. The pipe joint 1 thus contributes to increasing reliability and productivity.

The seal 36 is created at the annular sealing line 38 at which the tapered projection 18a is in line contact with the tapered recess 16a.

The seal 36 created by the line contact between the tapered recess 16a and the tapered projection 18a is reliable as compared with a seal created by face contact between them, even when the pressing force exerted by the pressing member 10 is not so great. Thus, the pipe joint 1 has an effectively-increased sealing capacity. The sealing capacity of the pipe joint 1 can be further increased by inserting a thin plate, not shown, between the positioning portion 10a and the first inner end face 28a, thereby increasing the pressing force exerted by the pressing member 10.

Further, the pressing portion 10b of the pressing member 10 has two ridge lines 10b3 formed by bending, so that the washer 12 is pressed by the pressing member 10 at two linear pressing lines 40. This ensures that the pressing member 10 presses on the washer 12 in the center, thereby increasing the reliability of the seal 36 which depends on the pressing force exerted by the pressing member 10. The pipe joint 1 has thus an effectively-increased sealing capacity.

The casing 8 has a fourth opening 30 in the second side wall 8d which is opposite the third opening 26 in the first side wall 8c and in communication with the receiving space (2) 28, and the pressing member is fitted with the bottoms of the U-shaped cutouts 10a2, 10b2 in the positioning portion 10a and the pressing portion 10b located near or on the second pipe member 6 and with the distal ends 10a1 of the positioning portion 10a projecting from the fourth opening 30. This allows the pressing member 10 to be easily removed from the casing 8 by pushing on the distal ends 10a1 of the positioning portion 10a projecting from the fourth opening 30. This facilitates the replacement of the pressing member 10 and the disassembly of the pipe joint 1. The pipe joint 1 thus provides increased ease of maintenance.

The casing 8 has inward projecting portions 28e on the inner side faces 28c, 28d defining the receiving space (2) 28 for the pressing member 10, and the pressing member 10 is formed such that the positioning portion 10a has a dimension in the width direction Z which renders the positioning portion 10a complementary to the inward projecting portions 28e when the pressing member 10 is fitted in the receiving space (2) 28. This prevents erroneous fitting of the pressing member 10 in the receiving space (2) 28 of the casing 8, such as fitting the pressing member with the pressing portion 10b in contact with the first inner end face 28a, and ensures that the pressing member 10 comes into line contact with the washer 12, thereby pressing on the washer 12 at the contact line. The pipe joint 1 has thus improved sealing capacity, and contributes to increasing productivity.

In the above, an embodiment of the present invention has been described. The present invention is however not limited to the described embodiment, to which various alterations can be made without deviating from the essentials of the present invention.

For example, although in the described embodiment, the first flange portion 16 has a tapered recess 16a and the second flange portion 18 has a tapered projection 18a, the configuration is not limited to this. Any desired configuration that can provide a sealing line 38 may be adopted. For example, it may be altered such that the first flange portion 16 has a tapered projection while the second flange portion 18 has a tapered recess.

Although in the described embodiment, the pressing member is fitted in the casing with the distal ends 10a1 of the positioning portion 10a projecting from the fourth opening 30 in the second side wall 8d, the configuration is not limit to this. It may be arranged such that the distal ends 10b1 of the pressing portion 10b project from the fourth opening 30 or the distal ends 10a1 as well as the distal ends 10b1 project from the fourth opening 30.

Figure 23:
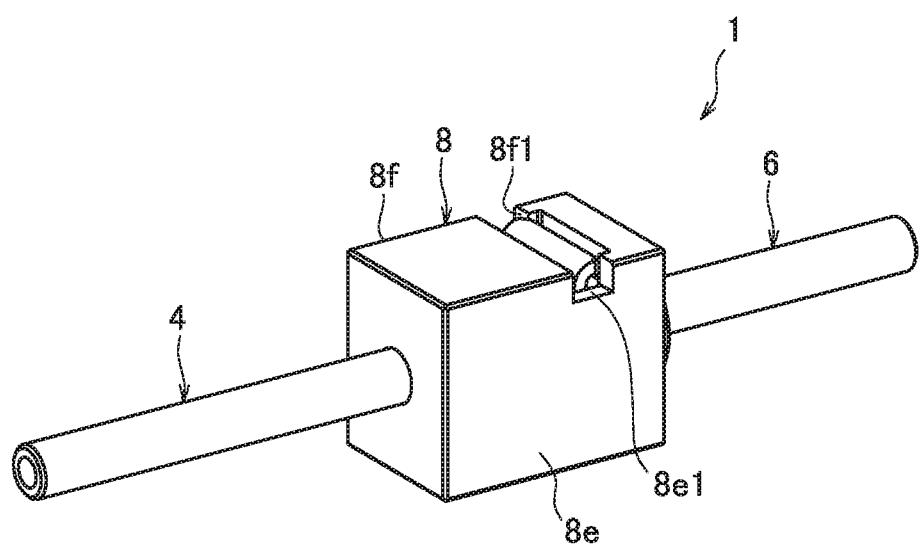
FIG. 23 is a perspective view of a pipe joint according to the present invention embodied with another type of casing.

The casing 8 is not limited to the shape in the described embodiment. For example, as shown in FIG. 23, the casing 8 may have cutouts 8e1, 8f1 in the third and fourth side walls 8e, 8f, each cutout being in communication with the receiving space (2) 28. This allows the pressing member 10 in the receiving space (2) 28 to be gripped using a dedicated jig or the like, thereby allowing the pressing member 10 to be removed from the side from which the pressing member 10 has been inserted, thus providing increased ease of work.

Although the pressing member 10 is preferably a leaf spring, it is not limited to the shape in the described embodiment.

The present invention is applicable to a pipe joint not comprising a washer 12 or a bush 14.

With reference to FIG. 2, an example in which the semiconductor fabrication apparatus 104 is a CVC apparatus has been described. The semiconductor fabrication apparatus 104 may however be a sputtering apparatus or an etching apparatus. The etching apparatus (dry etching apparatus) comprises a processing chamber, a gas supply means (fluid control unit) and an exhaust means to perform processing on a surface of a material using corrosion action of a reactive gas.

The sputtering apparatus comprises a target, a vacuum chamber, a gas supply means (fluid control unit) and an exhaust means to form a film on a surface of a material. The etching apparatus as well as the sputtering apparatus comprises a fluid control unit constituting a gas supply means. Thus, use of the reduced-sized pipe joint 1 or use of a fluid control device using the reduced-sized pipe joint 1 allows such apparatuses to have a reduced size.

Fluid control devises 100, such as on/off valves 114, 116, 118, 113, to which the pipe joint 1 is applied are applicable not only to the fluid control unit 102 but also to a variety of other fluid control units for constituting a fluid circuit, and the fluid control units 102 including the fluid control devices 100 are in turn applicable not only to the semiconductor fabrication apparatus 104 but also a variety of other fabrication apparatuses.

EXPLANATION OF REFERENCE SIGNS

1 Pipe joint
4 First pipe member
4a Outer end (second end)
4b Inner end (first end)
6 Second pipe member
6a Outer end (second end)
8 Casing
8a First end wall
8b Second end wall
8c First side wall
8d Second side wall
10 Pressing member
10a Positioning portion
10a1 Distal end
10a2 Cutout
10b Pressing portion
10b1 Distal end
10ba2 Cutout
10b3 Ridge line
10c Curved portion
12 Washer
14 Bush
14a End
16 First flange portion
16a Tapered recess
18 Second flange portion
18a Tapered projection
22 First opening
24 Second opening
26 Third opening
28 Receiving space (2)
28a First inner end face
28b Second inner end face
28c, 28d Inner side face
28e Inward projecting portion
30 Fourth opening
32 Flange receiving space (1)
36 Seal
100 Fluid control device
102 Fluid control unit
104 Semiconductor fabrication apparatus

The invention claimed is:

1. A method of forming a pipe joint including
a first hollow pipe member with a first flange portion,
a second hollow pipe member with a second flange portion, and
a casing for connecting the first and second pipe members with a seal created between the first and second flange portions, characterized by
preparing a plate-like pressing member for pressing the second flange portion against the first flange portion,
preparing the casing to have a first end wall, a second end wall opposite the first end wall, a first side wall between the first and second end walls, a flange receiving space inside, and a receiving space inside adapted to receive the pressing member, the first end wall having a first opening, the second end wall having a second opening, the first side wall having a third opening, the flange receiving space being in communication with the first and second openings, the receiving space being in communication with the flange receiving space, and allow the first pipe member to be inserted from the second opening toward the first opening until the first flange portion comes to rest within the flange receiving space,
inserting the second pipe member into the second opening with the second flange portion ahead until the second flange portion comes into contact with the first flange portion, and
inserting the pressing member through the third opening into the receiving space to press the second flange portion against the first flange portion, thereby creating a seal between the first and second flange portions.

2. The method according to claim 1, wherein
the seal is created by line contact between
a tapered recess formed in one of the first and second flange portions, and
a tapered projection formed to the other of the first and second flange portions such that the surface of the tapered projection exhibits a greater inclination with reference to a pipe diameter direction of the first and second pipe members than the surface of the tapered recess.

3. The method according to claim 2, wherein
the receiving space is defined by a first inner end face extending from the third opening in the pipe diameter direction and having the second opening, a second inner end face extending from the third opening in the pipe diameter direction and facing the first inner end face, and a pair of inner side faces connecting the first and second inner end faces.

4. The method according to claim 3, wherein
the pressing member comprises
a positioning portion to be brought into contact with the first inner end face to position the pressing member within the receiving space,
a pressing portion facing the positioning portion to be located to the second inner end face side to press the second flange portion, and
a curved portion connecting the positioning portion and the pressing portion to cause the pressing portion to exert a pressing force.

5. The method according to claim 4, wherein the pressing portion is bent between a distal end and the curved portion to protrude to the side opposite the positioning portion and form a ridge line extending widthwise across the pressing portion.

6. The method according to claim 5, wherein the positioning portion and the pressing portion have
distal ends facing each other, and
U-shaped cutouts extending from the respective distal ends in the pipe diameter direction over a length greater than the pipe diameter of the second pipe member.

7. A pipe joint component, comprising
a first pipe member with a first flange portion at a first end,
a second pipe member with a second flange portion at a first end, and
a casing and a pressing member for connecting the first and second pipe members with a seal created between the first and second flange portions, characterized in that
the casing has a first end wall, a second end wall opposite the first end wall, a first side wall between the first and second end walls, a flange receiving space inside, and a receiving space inside adapted to receive the pressing member, the first end wall having a first opening, the second end wall having a second opening, the first side wall having a third opening, the flange receiving space being in communication with the first and second openings, the receiving space being in communication with the flange receiving space, the pressing member is a plate-like elastic member, the first pipe member is adapted to be inserted from the second opening toward the first opening until the first flange portion comes to rest within the flange receiving space, the second pipe member is adapted to be inserted into the second opening with the second flange portion ahead until the second flange portion comes into contact with the first flange portion, wherein when the pressing member is inserted through the third opening into the space, the second flange portion is pressed against the first flange portion to create a seal between the first and second flange portions.

8. The pipe joint component according to claim 7, wherein the seal is created by line contact between a tapered recess formed in one of the first and second flange portions, and a tapered projection formed to the other of the first and second flange portions such that the surface of the tapered projection exhibits a greater inclination with reference to a pipe diameter direction of the first and second pipe members than the surface of the tapered recess.

9. The pipe joint component according to claim 7, wherein the receiving space is defined by a first inner end face extending from the third opening in the pipe diameter direction and having the second opening, a second inner end face extending from the third opening in the pipe diameter direction and facing the first inner end face and a pair of inner side faces connecting the first and second inner end faces.

10. The pipe joint component according to claim 7, wherein the pressing member comprises a positioning portion to be brought into contact with the first inner end face to position the pressing member within the receiving space, a pressing portion facing the positioning portion to be located to the second inner end face side to press the second flange portion, and a curved portion connecting the positioning portion and the pressing portion to cause the pressing portion to exert a pressing force.

11. The pipe joint component according to claim 10, wherein the pressing portion is bent between a distal end and the curved portion to protrude to the side opposite the positioning portion and form a ridge line extending widthwise across the pressing portion.

12. The pipe joint component according to claim 10, wherein the positioning portion and the pressing portion have distal ends facing each other, and U-shaped cutouts extending from the respective distal ends in the pipe diameter direction over a length greater than the pipe diameter of the second pipe member.

13. The pipe joint component according to claim 7, wherein the casing has a second side wall opposite the first side wall, and the second side wall has a fourth opening in communication with the receiving space.

14. The pipe joint component according to claim 10, wherein the pressing member is adapted to be received in the receiving space with the bottoms of the U-shaped cutouts in the positioning portion and the pressing portion located near or on the second pipe member and with the distal end of at least either the positioning portion or the pressing portion projecting from the fourth opening.

15. A pipe joint characterized by including a pipe joint component according to claim 7.

16. A fluid control device characterized by including a pipe joint according to claim 15.

17. The fluid control device according to claim 16, constituting a valve having a fluid inlet and a fluid outlet, wherein either the first or the second pipe member is connected to at least either the inlet or the outlet at a second end opposite the first end.

18. A fluid control unit characterized by including a fluid control device according to claim 16.

19. A semiconductor fabrication apparatus characterized by including a fluid control unit according to claim 18.

* * * * *